United States Patent [19]   [11]  4,275,648
Mouri et al.                  [45]  Jun. 30, 1981

[54] METHOD AND APPARATUS FOR PRODUCING FRUIT JUICES

[75] Inventors: Takenori Mouri, Toyonaka; Kengi Morimoto, Kitamine; Itaru Yoshimoto, Tokyo; Hiroyki Kayama, Kobayashi; Yukio Okazawa, Yokohama; Touru Sizukuisi, Itami, all of Japan

[73] Assignee: Toyo Seikan Kaisha Limited, Tokyo, Japan

[21] Appl. No.: 114,359

[22] Filed: Jan. 22, 1980

Related U.S. Application Data

[62] Division of Ser. No. 9,736, Feb. 5, 1979.

[30] Foreign Application Priority Data

Feb. 8, 1978 [JP] Japan ................................ 53-12324
Feb. 23, 1978 [JP] Japan ................................ 53-19102

[51] Int. Cl.³ .............................................. A23L 2/02
[52] U.S. Cl. ...................................... 99/483; 99/484; 99/485; 99/511; 426/51

[58] Field of Search .............. 49/483, 485, 275, 510, 49/511, 512, 517; 426/51, 50, 599, 615, 616, 489, 518

[56] References Cited

U.S. PATENT DOCUMENTS

| 3,031,307 | 4/1962 | Blakemore | 426/50 |
| 3,236,655 | 2/1966 | Murch | 426/50 |
| 3,420,676 | 1/1969 | Keitel | 426/51 |
| 3,666,487 | 5/1972 | Yokotsuka | 426/51 |
| 3,731,613 | 5/1973 | Wolff | 99/275 |

FOREIGN PATENT DOCUMENTS

| 7703635 | 2/1977 | France | 426/51 |
| 54-74937 | 1/1979 | Japan. | |
| 54-74938 | 1/1979 | Japan. | |
| 54-74939 | 1/1979 | Japan. | |

Primary Examiner—Robert W. Jenkins
Attorney, Agent, or Firm—Wenderoth, Lind & Ponack

[57] ABSTRACT

An apparatus for producing a fruit juice by the enzymatic reaction of a whole fruit including the rind, a fruit rind, a squeeze residue or a frozen product thereof as a raw material, the improvement wherein the enzymatic reaction is carried out while finely dividing the raw material.

1 Claim, 5 Drawing Figures

METHOD AND APPARATUS FOR PRODUCING FRUIT JUICES

This is a division of application Ser. No. 9,736, filed Feb. 5, 1979.

This invention relates to an apparatus for producing fruit juices from whole fruits including outer skins, the rinds of fruits, squeeze residues of fruits, or frozen products of these as a raw material.

It is well known that the rind of citrus fruits such as oranges is nutritionally excellent because it contains great quantities of various vitamins such as vitamin A and vitamin C. It is partly utilized as a material for fruit juices, but most of it is simply thrown away. Since discarding a great quantity of the fruit rind causes environmental pollution, fruit processing mills are eager to find a suitable and commercially feasible way of disposing of the fruit rind. On the other hand, disposal of the squeeze residues that occur during the production of ordinary orange juices is very troublesome because the inner skins of oranges contain large quantities of pectin.

Many attempts have been made heretofore to utilize the rind and other wastes of citrus fruits, for example by extracting effective ingredients therefrom, but most of such attempts have been unsuccessful because of various difficulties. One attempt is to make a juice from the orange rind. However, it presents difficulties because the rigid cellulosic structure of the rind is not easy to soften, and the rind has a peculiar odor and taste which debase the quality of the resulting juices.

The present inventors extensively worked in order to solve the above problems, and found that fruit juices free from unpleasant odor and taste can be produced from whole fruits containing skins, the rinds of fruits, squeeze residues, or frozen products of these by boiling the raw material at a temperature of at least 90° C. for 3 to 20 minutes, destroying its texture by a chopper or the like, adding about 0.25%, based on the weight of material, of an enzyme for decomposing the plant tissues of the crushed material, deactivating the enzyme by a suitable procedure, filtering the product, and concentrating it. This method is described in Japanese Patent Applications Nos. 74937/1977 to 74939/1977.

It is an object of this invention to improve the aforesaid prior method and to provide a method and an apparatus for producing a fruit juice free from an unpleasant taste and odor from the aforesaid raw materials in a higher yield within a shorter treating time by using a lesser amount of enzyme than in the prior art.

The present inventors have found in the course of continued investigations that the above object of the invention can be achieved by further comminuting the raw material during the enzymatic reaction by means of a stirrer, a homomixer, or the like.

According to this invention, there is provided an improved process for producing a fruit juice which comprises a step of crushing a raw material fruit, such as citrus fruits, tomatoes and apples, which is in the form of a whole fruit including an outer skin, the rind, a squeeze residue, or a frozen product thereof, a step of adding 0.05 to 0.3%, based on the weight of raw material, of a plant tissue-decomposing enzyme such as cellulase, hemicelluslase, amylase, pectinase or a mixture thereof and performing the enzymatic reaction of the raw material, and a step of removing the unsuitable flavor of the product by deactivating the enzyme and filtering and concentrating the product; wherein after the addition of the enzyme, the enzymatic reaction is performed while finely dividing the raw material further by a stirrer, homomixer or the like.

It is the general practice in the making of fruit juices to perform such an enzymatic reaction while slowly stirring the crushed raw material. In contrast, in the present invention, the enzymatic reaction is performed while further reducing the size of the crushed raw material.

Desirably, the raw material is boiled for 3 to 20 minutes prior to the crushing step. This serves to stabilize vitamins in the material and thus prevent them from decomposition in the subsequent steps. The boiling conditions somewhat vary according to the kind of the fruit. Usually, the boiling is carried out at a temperature of at least 90° C. for about 3 to 10 minutes.

The raw material is first crushed to a size of less than about 10 mm, preferably about 5 mm, and a predetermined amount of water is added to perform the enzymatic reaction efficiently. The crushing is usually performed by means of a chopper. The amount of water to be added is about ½, about 2 to 3 times, and about 2 times, of the weight of the whole fruit, the fruit rind, and squeeze residue, respectively.

Suitable enzymes include cellulase, hemicellulase, pectinase, and amylase derived from the genus Aspergillus and the genus Trichoderma. The enzyme is used generally in an amount of about 0.05 to 0.3% by weight based on the weight of the raw material.

The process of this invention is described in detail below with reference to a preferred embodiment.

It is first necessary to adjust the pH of the crushed material to 3–4 with an organic acid, for example an adible organic acid such as citric acid. Then, the enzyme is added, and while performing the enzymatic reaction, the raw material is further finely divided by a stirrer, a homomixer or the like (rotatable at a speed of, say, 1500 to 12,000 rpm) so that the dimension of the smallest portion of the material becomes about 0.1 to 2.0 mm (desirably about 0.1 to 1 mm). The finely divided raw material is sent to an enzyme treatment tank (reaction vessel). That the smallest portion of the raw material has a dimension of about 0.1 to 3.0 mm means that it has such a coarseness as to be passable through a meshwork having a size of 0.1 to 3.0 mm by any method. Treatment with the stirrer or homomixer and treatment in the enzyme treatment tank are carried out at a temperature of 30° to 50° C. The enzymatic reaction may be further promoted by providing a propeller stirrer or the like in the enzyme treatment tank, and rotating it at a speed of, say, 500 to 4,000 rpm. The enzymatic reaction in the above step ends generally in 0.5 to 2 hours.

The mixture which has thus been subjected to the enzymatic reaction is then heated at about 100° C. for less than about 5 minutes to deactivate the enzyme, then immediately cooled aproximately to room temperature, and filtered by a centrifugal separator or the like. The filtrate is then concentrated under reduced pressure to about a half of its original weight at a relatively low temperature of about 75 to 80° C. whereby its unsuitable flavor, especially the unpleasant flavor of the rind, can be removed. After the concentration, a suitable amount (for example, 2 to 12 times) of water is added to produce fruit juices of different degrees of sweetness. It is of course possible also to change the taste of the juice by adding other flavors or mixing with other ordinary fruit juices.

The present invention is described more specifically below with reference to the accompanying drawings in which.

The devices in FIGS. 2, 3, 4 and 5 are continuous in this order.

Figure 1:
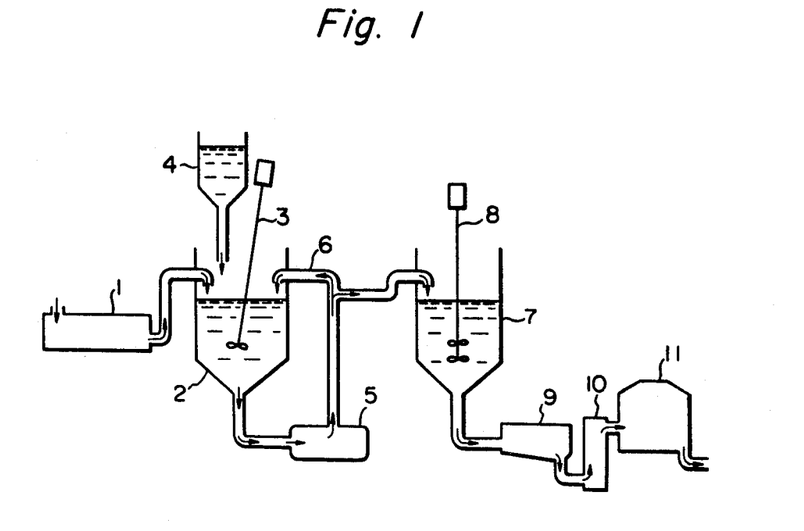
FIG. 1 is a schematic view showing the arrangement of devices suitably used in the practice of the process of this invention.

Referring to FIG. 1, the raw material is put into a chopper 1 and sent to a mixing tank 2 where it is mixed with an enzyme fed from an enzyme tank 4 by means of a stirrer 3. The mixture from the mixing tank 2 is then sent to a comminution tank (homomixer chamber) 5 where its enzymatic reaction proceeds while it is being finely divided by the homomixer. The mixture from the comminution tank 5 is sent to an enzyme treatment tank (reaction tank) 7 while as required, returning at least a part of the mixture to the mixing tank 2 through a bypass 6. A stirrer 8 is provided in the tank 7 where the enzymatic reaction of the mixture is finally completed. The reaction product after the enzymatic reaction is sent from the enzyme treatment tank 7 to a finisher (centrifugal separator) 9 where the waste is separated. The product is sent to a preheater 10, and then concentrated in an evaporator 11.

As modifications of the process illustrated in FIG. 1, the following procedures are also possible in the present invention.

(i) The order of arrangement of the comminution tank 5 and the enzyme treatment tank 7 is reversed. In other words, the mixture from the mixing tank 2 is sent to the comminution tank 5 through the enzyme treatment tank 7, and the mixture from the comminution tank 5 is sent to the finisher 9 while as required, at least a part of the mixture is returned to the enzyme treatment tank 7.

(ii) An additional enzyme treatment tank is provided between the mixing tank 2 and the comminution tank 5. In other words, the mixture from the mixing tank 2 is sent to the comminution tank 5 through the additional enzyme treatment tank, and the mixture from the comminution tank 5 is sent to the enzyme treatment tank 7 while as required, at least a part of the mixture is returned to the additional enzyme treatment tank.

According to another preferred embodiment of this invention, a fruit juice can be produced more effectively by the continuous process shown in FIGS. 2 to 5.

The process for continuously producing fruit juices in accordance with this invention comprises (1) a step of crushing the raw material (preferably the boiled raw material) to a size that can pass through a 10 mm mesh;

(2) a step of preparing a starting mixture by adding water or both water and a pH-adjusting organic acid such as citric acid to the crushed raw material;

(3) a step of heating the starting mixture to 20° to 50° C.;

(4) a step of finely dividing the heated starting mixture to a size that can be passed through a 3 mm mesh by treating it with a homomixer at a pH of 3 to 4 with or without addition of an enzyme;

(5) a step of performing the enzymatic reaction of the finely divided starting mixture by adding an enzyme (when an enzyme is added in the preceding step, the addition of an enzyme may be unnecessary) and holding the temperature of the mixture at 30° to 50° C. with stirring, said enzymatic reaction being performed by using a plurality of parallel-arranged enzyme treatment tanks so as not to interrupt the continuous liquid flow throughout the entire process;

(6) a step of removing the waste by filtering the reaction product by a filter having a mesh size of 0.1 to 1.0 mm;

(7) a step of sending the filtrate from the preceding step to a heater through a cushion tank (if desired, after sending it to a solid-liquid separator through a cushion tank, and performing solid-liquid separation while holding the filtrate within the cushion tank, thereby to remove the waste further), heating the filtrate at 60° to 100° C. while holding it within the cushion tank thereby to deactivate the enzyme, and then cooling it to a temperature of 10° to 50° C.; and (8) a step of passing the cooled filtrate through a filter having a mesh size of preferably 0.1 to 1.0 mm via a cushion tank to separate foreign matter, and sending the residue to a concentrator and concentrating it while holding it within the cushion tank.

This process is described more specifically below with reference to FIGS. 2 to 5.

Figure 2:
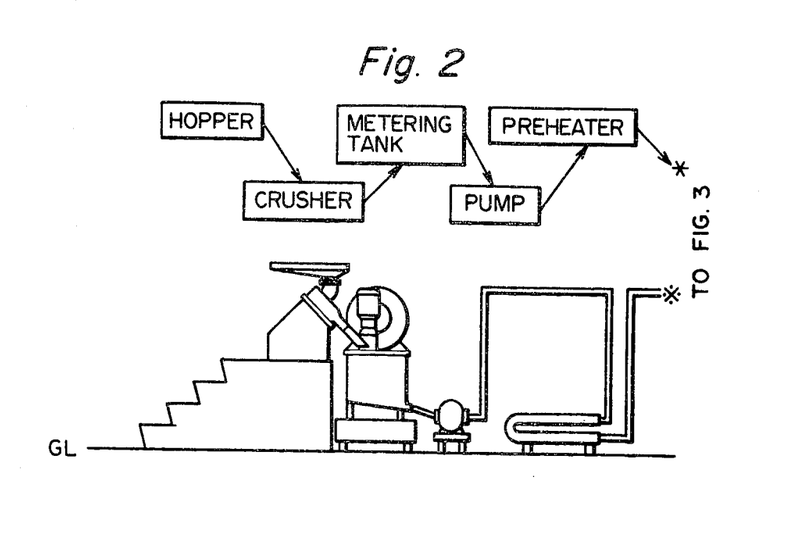
FIGS. 2 to 5 are schematic views showing a series of devices suitably used in the continuous practice of the process of this invention.

The raw material is fed from a hopper to a crusher (micrograder, 1000 rpm) at a rate of 3 to 6 kg/min., and crushed there to a size which can be passed through a mesh of 10 mm.

The crushed material is sent to a metering tank (capacity 200 liters), and water or both water and an organic acid such as citric acid is mixed to form a starting mixture. When a whole fruit is used as the raw material, the addition of an organic acid is sometimes unnecessary because the crushed material usually has a pH of 3 to 4. The amount of water added varies depending upon the kind of the raw material. For example, when the raw material comprises a whole fruit of oranges, the amount of water added is one half of the weight of the raw material. It is 2 to 3 times the weight of the rind of fruit, and about 2 times the weight of the squeeze residue. The organic acid is added so as to adjust the pH of the reaction mixture during the enzymatic reaction to 3 to 4. It may be added in a subsequent step without adding it in this step.

The starting mixture is then passed through a tubular type wall-type preheater and is thus heated to 20° to 50° C. The heated mixture is sent to a comminution tank (capacity 200 liters). This pre-heating is a preparatory step for smoothly starting the subsequent enzymatic reaction at 30° to 50° C., preferably about 45° C.

The comminution tank is equipped with a homomixer (1,500 to 4,000 rpm), and the starting mixture is finely divided there to a size that can be passed through a mesh of 3 mm. To retain the flavor of the mixture properly, it is advisable not to comminute it to a finer size than 0.1 mm.

When an organic acid is not added in the preceding step or when it needs to be additionally added, it is added at this stage. When the raw material comprises a whole fruit, the addition of the organic acid may be unnecessary as stated hereinabove. If desired, an enzyme for the enzymatic reaction in the subsequent step may be added at this stage. It this case, some portion of the enzymatic reaction proceeds in the comminution tank.

Figure 3:
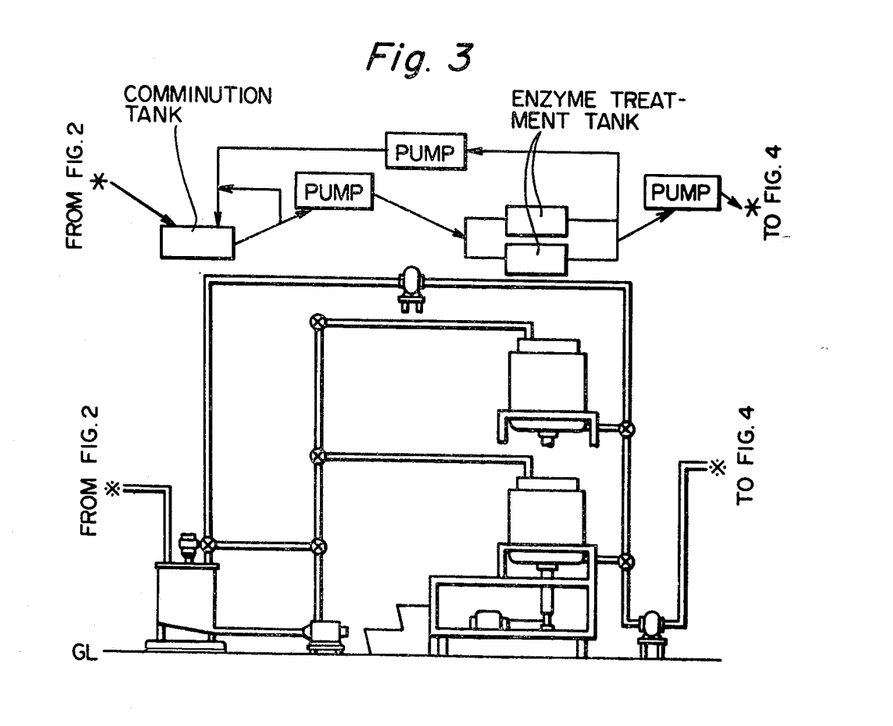

The starting mixture finely divided in the comminution tank is sent to an enzyme treatment tank (capacity 200 liters) by means of a pump (900 to 3,000 liters/hr).

If desired, at least a part of the starting mixture may be recycled to the comminution tank through a circulating pipe. When an enzyme is not added in the comminution tank or when it needs to be additionally supplied, an enzyme is added at this stage. The amount of the enzyme required for the enzymatic reaction in this invention is usually 0.05 to 0.3% by weight based on the starting mixture initially used. Suitable enzymes are, for example, cellulase, hemicellulase, pectinase, amylase, and mixtures thereof which are derived from the genus Aspergillus, the genus Trichoderma, etc.

The enzymatic reaction is carried out at a pH of 3 to 4 and a temperature of 30° to 50° C., preferably about 45° C., for 5 minutes to 1 hour with stirring. For this purpose, the enzyme treatment tank is equipped with a heating means and a stirrer (100 to 400 rpm) and is kept warm by a heat-insulating material. The time required from the beginning of the comminuting in the comminution tank to the end of the enzymatic reaction in the enzyme treatment tank is usually less than about 2 hours. In order to ensure continuous operation throughout the entire process without interruption of the liquid flow, a plurality (two in FIG. 3) of enzyme treatment tanks are arranged in parallel to each other, and in series between the comminution tank (preceding step) and a first-stage solid-liquid separator (subsequent step). They are switched over from one to the other by valve operation.

If required, the treated mixture may be returned from the enzyme treatment tank to the comminution tank to circulate it between the two tanks to perform the enzyme reaction completely.

The reaction product after the enzymatic reaction is sent to a first-stage solid-liquid separator (finisher) by a pump (900 to 3,000 liters/hr). The finisher is a filter equipped with a cylindrical screen having a mesh size of 0.1 to 1.0 mm. The filtrate which has passed through the screen is sent to the subsequent step, and the separated large fragments of solids are discarded.

Figure 4:
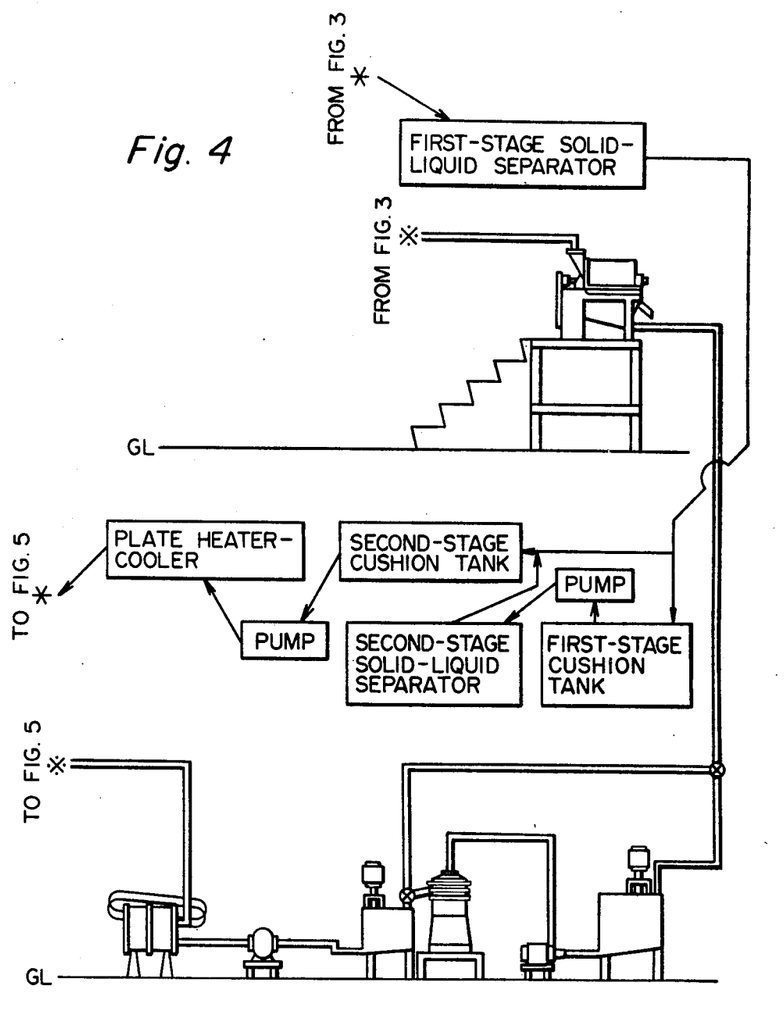

The filtrate is sent to a second-stage solid-liquid separator (e.g., a centrifugal separator) by means of a pump (900 to 3,000 liters/hr) through a first-stage cushion tank (drop tank). In the drawing, the filtrate from the finisher is sent to the drop tank by a difference in height. If desired, a pump may be used. The centrifugal separator is speed-variable between 5,000 rpm and 10,000 rpm, and has the ability to treat 50 to 300 kg of material per hour continuously. The filtrate from the finisher is conditioned by removing the excess suspended solids and other suspended materials which may have been carried through prior processing steps with this centrifugal separator. If desired, the drop tank (capacity, 2,000 liters) is equipped with a stirrer. The filtrate from the finisher is temporarily stored (with or without mixing) in the drop tank and then sent to the centrifugal separator by the pump. The drop tank is adapted to receive water therein, as required, to prevent no-load operation of the centrifugal separator.

The filtrate from the centrifugal separator is sent to a heater-cooler (plate type heater-cooler) by means of a pump (900 to 3,000 liters/hr) through a second-stage cushion tank (capacity 50 liters). The plate type heater-cooler consists of a chamber for heating the filtrate by a heating medium such as hot water, a holding tube for keeping the temperature of the filtrate heated by the heating medium for a certain period and a chamber for cooling the filtrate by a cooling medium such as cold water. The filtrate from the second-stage cushion tank which has entered the plate type heater-cooler is first heated to 60° to 100° C. and maintained at this temperature for 20 to 40 seconds to deactivate the used enzyme therein, and then cooled to 10° to 50° C. In an alternative embodiment not shown in the drawings, it is possible to detect the temperature of the filtrate by a certain temperature detector before it enters the holding tube, and when the temperature is below the predetermined temperature, to return the filtrate to the second-stage cushion tank by switching of a valve so as to heat it again and always treat it at the right temperature.

The second-stage cushion tank is adapted to temporarily store (with or without mixing) the filtrate from the centrifugal separator, and then to send it to the plate type heater-cooler by the rotary pump. It is also designed so as to receive water therein, and this prevents the no-load operation of the plate type heater-cooler.

When the large fragments of solids and excess suspended solids or the like are fully separated by the first-stage solid-liquid separator (finisher), the first-stage cushion tank and the second-stage solid-liquid separator may be omitted. In this case, the filtrate from the first-stage solid-liquid separator is directly sent to the second-stage cushion tank.

Figure 5:
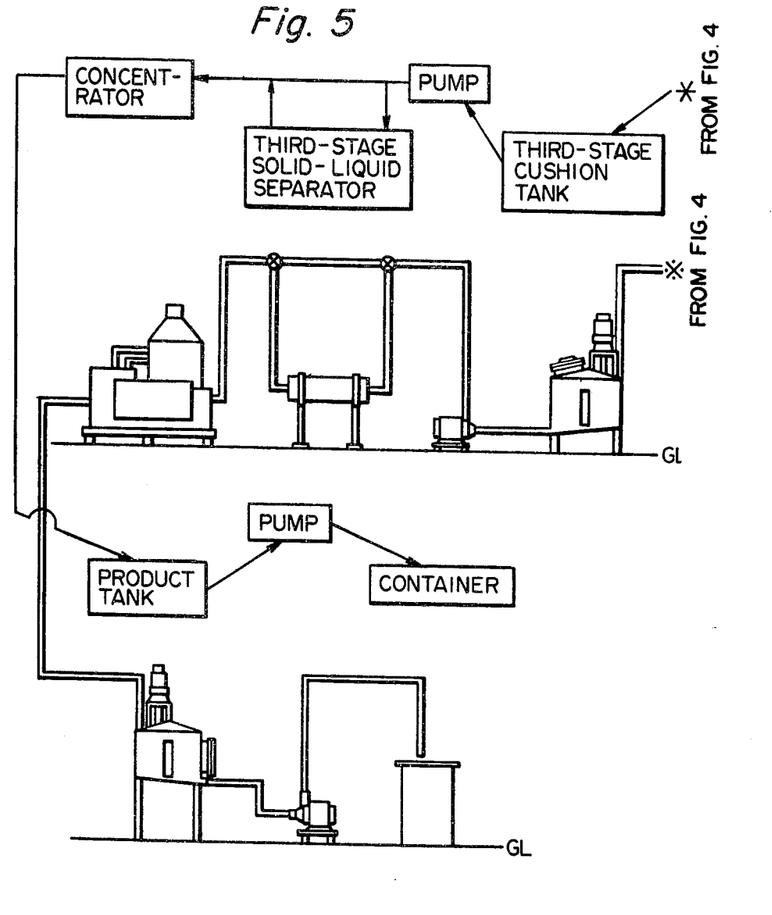

The cooled filtrate from the plate type heater-cooler is transferred to a third-stage solid-liquid separator (tube type filter) by means of a pump (900 to 3,000 liters/hr) via a third-stage cushion tank (balance tank), after which it is sent to a concentrator. The tube type filter is equipped with a screen having a mesh size of 0.1 to 1.0 mm. During passage through the tube-type filter, the filtrate from the balance tank is further purified by complete removal of the foreign matter included therein. Where this further purification is not necessary, the third-stage solid liquid separator may be omitted. A concentrator of a thin film evaporation method type concentrator utilizing centrifugal force is efficient. The purified filtrate from the tube type filter is evaporated and concentrated by this device usually under reduced pressure and at a temperature of 75° to 80° C. If desired, the balance tank (200 in capacity) is equipped with a stirrer. The filtrate from the plate type heater-cooler is temporarily stored (with or without mixing) in it, and then sent to the tube type filter by means of the pump. The balance tank is also adapted to permit charging of water as required, and this prevents the no-load operation of the concentrator.

The concentrate from the concentrator is stored in a product tank, sent to containers by means of a pump at certain times, packed by a packaging machine, and shipped.

According to this invention, there is also provided an apparatus for performing such a continuous process which comprises means (a) to (m) among which (g), (h) and (k) may be omitted.

(a) A crusher for crushing a raw material to a size that can be passed through a mesh of 10 mm;
(b) a metering tank for preparing a starting material mixture by mixing the raw material crushed by the crusher with water or both water and a pH-adjusting organic acid;
(c) a heater for heating the starting material mixture to a temperature of 20° to 50° C.;
(d) a comminution tank for treating the heated starting mixture by a homomixer with or without the addition of an enzyme thereby to finely divide the mixture to a size that can be passed through a mesh of 3 mm;

(e) a plurality of enzyme treatment tanks, arranged parallel, to each other, equipped with a stirrer for performing an enzymatic reaction by adding an enzyme to the finely divided starting mixture (when an enzyme is added to the aforesaid comminution tank, the addition of enzyme may be omitted) and keeping the temperature of the mixture at 30° to 50° C. with stirring;

(f) a first-stage solid-liquid separator equipped with a filter having a mesh size of 0.1 to 1.0 mm for filtering the reaction product that has left the enzyme treatment tanks after the enzymatic reaction thereby to remove the waste;

(g) a second-stage solid-liquid separator for treating the product from the first-stage solid-liquid separator to remove the excess suspended solids and other suspended materials which may have been transfered through prior processing steps;

(h) a first-stage cushion tank provided between the first-stage solid-liquid separator and the second-stage solid-liquid separator for temporarily storing the liquid from the first-stage solid-liquid separator thereby to prevent no-load operation of the second-stage solid-liquid separator;

(i) a heater-cooler for heating the liquid from the second-stage solid-liquid separator at 60° to 100° C. for 20 to 40 seconds to deactivate the enzyme and then cooling it to a temperature of 10° to 50° C.;

(j) a second-stage cushion tank provided between the second-stage solid-liquid separator and the heater-cooler for temporarily storing the liquid from the second-stage solid-liquid separator to prevent no-load operation of the heater-cooler;

(k) a third-stage solid-liquid separator equipped with a filter having a mesh size of 0.1 to 1.0 mm for filtering the liquid from the heater-cooler to remove foreign matter;

(l) a concentrator for concentrating the liquid from the third-stage solid-liquid separator by evaporation; and (m) a third-stage cushion tank provided between the heater-cooler and the third-stage solid-liquid separator for temporarily storing the liquid from the heater-cooler to prevent no-load operation of the concentrator.

In the conventional production of juices of fruits, etc., the raw material is first crushed and then subjected to an enzymatic reaction with stirring. In contrast, in the present invention, the enzymatic reaction is carried out after or while finely dividing the crushed material further, and if required, the liquid flow is circulated to complete the reaction. Since the finely divided raw material is more easily decomposed by the enzyme and the circulation of the raw material increases the efficiency of reaction between the substrate and the enzyme, the method of this invention has the advantage that the amount of the enzyme can be smaller than in the conventional methods.

While the period of the enzymatic reaction in the conventional methods is about 4 hours, the time required from the beginning of the comminution treatment to the end of the enzymatic reaction in the method of this invention is within 2 hours. When the entire steps are continuous, the shortening of the treating time as a whole is very great. In addition, the yield of the final fruit juice based on the raw material in the method of this invention reaches 94 to 99%, which is about a 5% increase over that in the conventional methods.

It is surprising that while the concentrating step in the conventional production of ordinary fruit juices is carried out by avoiding the loss of the flavor of the material or by adding a flavor, no such consideration is required in the present invention, and the unacceptable flavor of juice, especially the one contained in the rind, can be satisfactorily removed automatically in the concentrating operation, and a flavor acceptable for drinking can be obtained. This is probably because the large amount of vitamins contained in the rind act effectively at the time of concentration under heat without causing a loss of the freshness of fruits, and the concentrating operation drives off the unacceptable flavor substances derived from the rind.

The flavor of the juice obtained by the present invention is superior to that of ordinary marketed juices produced by an in-line extractor. When the concentrate is diluted to the original volume by adding water, its sweetness is somewhat less despite its good flavor as shown by a BX of about 2 to 6. Sugar may therefore be added optionally to make it as sweet as ordinary juices. However, it may be served without increasing its sweetness. Of course, its taste may be changed by seasoning it otherwise, or mixing it with other ordinary juices.

The juices obtained by this invention contain an abundance of vitamins and are thus nutritionally excellent. Furthermore, since the rind and squeeze residues which are difficult to dispose of can be utilized effectively by the present invention, the cost of production is comparatively low, and pollution by these materials can be prevented. Another great commercial advantage is that the treating time for juice preparation can be markedly shortened.

The following Examples specifically illustrate the present invention.

EXAMPLE 1

Ten kilograms of whole oranges ("Unshu" variety) were boiled at 100° C. for 7 minutes, and washed with a large quantity of water. The oranges were then crushed by a chopper 1 to a size of about 5 mm, the crushed oranges were sent to a mixing tank 2 and 5 liters of water and 0.1% (10 g) of commercially available cellulase were added.

The mixture was subjected to an enzymatic reaction for 1.5 hours at 40° C. while rotating a stirrer 3 at 500 rpm and a homomixer 5 at 1800 rpm and circulating it through a by-pass 6.

The temperature was then raised to 100° C., and the reaction mixture was maintained at this temperature for 5 minutes to deactivate the enzyme. It was then filtered by a centrifugal separator 9 to obtain 14.5 kg of juice. The resulting juice was concentrated to ½ of the original volume at 80° C. by an evaporator, and then diluted to the original volume by adding water to form a fruit juice product.

EXAMPLE 2

Ten kilograms of the rind of orange ("Unshu" variety) were boiled at 100° C. for 7 minutes, and washed with a large quantity of water. The rind was then crushed to a size of about 5 mm by a crusher 1, and in a mixing tank 2, 30 liters of water and 0.1% (10 g) of cellulase were added. The pH of the mixture was adjusted to 3 with citric acid.

The mixture was subjected to an enzymatic reaction for 1.5 hours at 40° C. while rotating a stirrer 3 at 500 rpm and a homomixer 5 at 1800 rpm and while circulating the material through a by-pass 6.

The temperature of treated material was then raised to 100° C., and the reaction mixture was maintained at this temperature for 5 minutes to deactivate the enzyme. It was filtered by a centrifugal separator 9 to obtain 38 kg of a juice. The juice was concentrated to ½ of its original volume at 80° C., and then diluted to the original volume by adding water to form a fruit juice product.

Comparative Examples 1 and 2

Examples 1 and 2 were repeated except that the homomixer was not used, and the enzymatic reaction was performed for 3 hours by adding 0.25% (25g) of cellulase. The amounts of the resultant juices were 14 kg in Comparative Example 1 and 37 kg in Comparative Example 2.

Comparative Example 3

Example 1 was repeated except that after crushing, the raw material was finely divided by a homomixer, the enzymatic reaction was performed only by stirring without using a homomixer, and the raw material was not circulated during the enzymatic reaction.

Organoleptic Test 1

The products of Example 1 and Comparative Example 1 were submitted to 30 panelists to compare the flavors of the juices. Twenty-three panelists judged that the product of Example 1 had a better flavor than Comparative Example 1, and 7 panelists judged that the product of Comparative Example 1 had a better flavor.

The result of $X^2$ detection was as follows:

$$X_o^2 = [(23-15)^2 \times 2]/15 = 8.53$$

This means that the product of Example 1 had better flavor than the product of Comparative Example 1 at 0.5% significance.

Organoleptic Test 2

The products of Example 1 and Comparative Example 2 were submitted to 30 panelists to evaluate the flavors of the juices. Twenty-two panelists answered that the product of Example 1 had a better flavor than the product of Comparative Example 2, and 8 panelists judged that the product of Comparative Example 2 had a better flavor.

The result of $X^2$ detection was as follows:

$$X_o^2 = [(22-15)^2 \times 2]/15 = 6.53$$

This means that the product of Example 1 had a better flavor than the product of Comparative Example 2 at 2.5% significance.

Organoleptic Test 3

The products of Example 1 and Comparative Example 3 were submitted to 30 panelists to evaluate the flavors of the juices. Twenty-eight panelists judged that the flavor of the product of Example 1 was better, and 2 panelists judged that the flavor of the product of Comparative Example 3 was better.

The result of $X^2$ detection was as follows:

$$X_o^2 = [(28-15)^2 \times 2]/15 = 22.5$$

This means that the product of Example 1 had a better flavor than the other at 0.1% significance.

Example 3

Whole oranges ("Unshu" variety) (processed amount, 100 kg/30 minutes) were boiled at 100° C. for 7 minutes, and washed with a large quantity of water. This raw material was processed by the continuous apparatus shown in FIGS. 2 to 5.

The raw material was crushed to a size of about 8 mm by a crusher, and 50 liters of water was added by using a metering tank. The mixture was passed through a preheater kept at 40° C., and then sent to a comminution tank where 100 g of commercially available cellulase was added and a small amount of citric acid was added to adjust the pH of the mixture to about 4. At about 45° C., a homomixer was rotated at 4,000 rpm for about 10 minutes to finely divide the raw material to a size passable through a mesh of 3 mm, and during this time the enzymatic reaction of the raw material was allowed to proceed. The mixture was sent to enzyme treatment tanks and subjected further to enzymatic reaction at about 45° C. for 40 minutes with stirring at 300 rpm.

Then, the reaction product was filtered by a finisher having a mesh of 0.5 mm, and while being caused to stagnate in a drop tank, subjected to a centrifugal separator at 10,000 rpm to remove the excess suspended solids and the like. Then, while the product was caused to stagnate in a cushion tank, it was passed over a plate type heater heated at 95° C., and by maintaining the product at this temperature for 40 seconds in a holding tube, the enzyme was deactivated. The product was then cooled to 30° C. by a plate type cooler.

The cooled liquid (141 kg) was subsequently passed through a tube type filter having a mesh size of 0.1 mm while being allowed to stagnate in a balance tank. Then, it was sent to a concentrator where it was concentrated to about ⅕ of the original volume.

Thus, a concentrated juice having about 5 times as much flavor as an ordinary juice was obtained. It was diluted to five times, and sugar was added to produce a sweet fresh juice having a superior aroma shown by a BX of about 10.

The resulting juice and a marketed juice reduced from concentrated juice by diluting to the original volume were submitted to evaluation by 30 panelists. Twenty-nine panelists judged that the juice obtained by this Example had a better flavor than the marketed product although there was no appreciable difference in sweetness.

Much the same result as above was obtained when cellulase was added in enzyme treatment tanks instead of adding it in the crushing tank.

What we claim is:

1. An apparatus for producing a fruit juice continuously from a whole fruit including the rind, a fruit rind, a squeeze residue or a frozen product thereof as a raw material, said apparatus comprising
   (a) a crusher for crushing the raw material to a size that can be passed through a mesh of 10 mm,
   (b) a metering tank for preparing a starting material mixture by mixing the raw material crushed by the crusher with water or both water and a pH-adjusting organic acid,
   (c) a heater for heating the starting material mixture to a temperature of 20° to 50° C.,
   (d) a comminution tank for treating the heated starting mixture by a homomixer with or without the addition of an enzyme thereby to finely divide the mixture to a size that can be passed through a mesh of 3 mm, (e) a plurality of enzyme treatment tanks equipped with a stirrer and arranged parallel to each other for performing enzymatic reaction by adding an enzyme to the finely divided starting mixture (when an enzyme is added to the aforesaid comminution tank, the addition of enzyme to said treatment tanks may be omitted) and keeping the temperature of the mixture at 30° to 50° C. with stirring, (f) a first-stage solid-liquid separator equipped with a filter having a mesh size of 0.1 to 1.0 mm for filtering the reaction mixture that has left the enzyme treatment tanks after the enzymatic reaction thereby to remove large fragments of solids, (g) a second-stage solid-liquid separator for treating the product from the first-stage solid-liquid separator to further remove suspended materials.

(h) a first-stage cushion tank provided between the first-stage solid-liquid separator and the second-stage solid-liquid separator for temporarily storing the liquid from the first-stage solid-liquid separator thereby to prevent no-load operation of the second-stage solid-liquid separator, (i) a heater-cooler for heating the liquid from the second-stage solid-liquid separator at 60° to 100° C. for 20 to 40 seconds and then cooling it to a temperature of 10° to 50° C., (j) a second-stage cushion tank provided between the second-stage solid-liquid separator and the heater-cooler for temporarily storing the liquid from the second-stage solid-liquid separator to prevent no-load operation of the heater-cooler, (k) a third-stage solid-liquid separator equipped with a filter having a mesh size of 0.1 to 1.0 mm for filtering the liquid from the heater-cooler to remove foreign matter, (l) a concentrator for concentrating the liquid from the third-stage solid-liquid separator by evaporation, and (m) a third-stage cushion tank provided between the heater-cooler and the third-stage solid-liquid separator for temporarily storing the liquid from the heater-cooler to prevent no-load operation of the concentrator; provided that the second-stage solid-liquid separator (g), the first-stage cushion tank (h), and the third-stage solid-liquid separator (k) may be omitted.

* * * * *